US010539586B2

(12) United States Patent
Grokop et al.

(10) Patent No.: US 10,539,586 B2
(45) Date of Patent: Jan. 21, 2020

(54) TECHNIQUES FOR DETERMINATION OF A MOTION STATE OF A MOBILE DEVICE

(75) Inventors: Leonard Henry Grokop, San Diego, CA (US); Bhuwan Dhingra, Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 662 days.

(21) Appl. No.: 13/619,143

(22) Filed: Sep. 14, 2012

(65) Prior Publication Data

US 2013/0245986 A1 Sep. 19, 2013

Related U.S. Application Data

(60) Provisional application No. 61/535,922, filed on Sep. 16, 2011.

(51) Int. Cl.
*G01P 13/00* (2006.01)
*H04M 1/725* (2006.01)
*H04W 4/02* (2018.01)

(52) U.S. Cl.
CPC ......... *G01P 13/00* (2013.01); *H04M 1/72569* (2013.01); *H04W 4/027* (2013.01); *H04M 2250/12* (2013.01)

(58) Field of Classification Search
CPC . H04W 52/0254; H04W 64/00; H04W 48/04; H04W 52/0251; H04W 4/02; H04W 4/027; H04W 64/006; H04W 2250/12; A61B 5/1123; G01P 13/00; H04M 1/72569
See application file for complete search history.

(56) References Cited

U.S. PATENT DOCUMENTS 7,617,042 B2 11/2009 Horvitz et al.
2006/0167647 A1 7/2006 Krumm et al.
(Continued)

FOREIGN PATENT DOCUMENTS

CN 1941752 A 4/2007
CN 102024094 A 4/2011
(Continued)

OTHER PUBLICATIONS

International Search Report and Written Opinion—PCT/US2012/055622—ISA/EPO—dated Jan. 25, 2013.

*Primary Examiner* — Kyle R Quigley
(74) *Attorney, Agent, or Firm* — Kilpatrick Townsend & Stockton; Robert A. Reid

(57) ABSTRACT

Systems and methods herein enable a mobile device to detect that a user is traveling in association with a vehicle based at least on motion data. In some embodiments, accelerometer data is used. Motion data is leveraged in combination with various observations regarding vehicular movement to determine whether or not a mobile device is located in or on the vehicle. For instance, before entering the state of vehicular movement, it can be determined that the user is first in a walking state (e.g., walking to the car, bus, etc., and entering it). Likewise, after exiting the state of vehicular movement, the user re-enters the walking state (e.g., after stepping out of the car, bus, etc., the user again begins walking). Further, it can be determined that when the user is in the walking state, the accelerometer signals appear different to any accelerometer signals seen in the vehicular movement state.

30 Claims, 11 Drawing Sheets

(56) References Cited

U.S. PATENT DOCUMENTS

| | | | |
|---|---|---|---|
| 2011/0070863 A1* | 3/2011 | Ma et al. ....................... | 455/410 |
| 2012/0059581 A1 | 3/2012 | Sambongi | |
| 2012/0059623 A1 | 3/2012 | Sambongi | |
| 2012/0221244 A1* | 8/2012 | Georgy et al. ................ | 701/472 |
| 2012/0289244 A1* | 11/2012 | Goyal ........................ | 455/456.1 |
| 2012/0330544 A1* | 12/2012 | Joong ................ | G01C 21/3605 |
| | | | 701/408 |
| 2013/0179107 A1* | 7/2013 | Setoguchi et al. .............. | 702/94 |

FOREIGN PATENT DOCUMENTS

| | | | |
|---|---|---|---|
| EP | 1104143 | A2 | 5/2001 |
| EP | 1732300 | A2 | 12/2006 |
| EP | 2469303 | A1 | 6/2012 |
| JP | 2005197799 | A | 7/2005 |
| JP | 2009210473 | A | 9/2009 |
| JP | 2009284255 | A | 12/2009 |
| JP | 2009300195 | A | 12/2009 |
| JP | 2011504331 | A | 2/2011 |
| WO | 2010059934 | A2 | 5/2010 |
| WO | 2011083572 | A1 | 7/2011 |

* cited by examiner

TECHNIQUES FOR DETERMINATION OF A MOTION STATE OF A MOBILE DEVICE

CROSS REFERENCES

This application claims the benefit of U.S. Provisional Application 61/535,922, filed Sep. 16, 2011 and titled "DETECTING THAT A MOBILE DEVICE IS RIDING IN AN AUTOMOTIVE VEHICLE," the disclosure of which is incorporated by reference herein in its entirety for all purposes.

BACKGROUND

Mobile devices are widespread in today's society. For example, people use cellular phones, smart phones, personal digital assistants, laptop computers, pagers, tablet computers, etc. to send and receive data wirelessly and perform other operations from countless locations. Moreover, advancements in mobile device technology have greatly increased the versatility of today's devices, enabling users to perform a wide range of tasks from a single, portable device that conventionally required either multiple devices or larger, non-portable equipment.

Being able to robustly detect that a mobile device user is riding in a moving vehicle such as a car, bus, truck, etc., can be leveraged by a variety of applications for enhanced functionality. Thus, systems, methods, and devices for detecting that a mobile device is riding in a vehicle are desired.

SUMMARY

Embodiments of the invention may solve these aforementioned problems and other problems according to the disclosures provided herein.

Systems and methods herein enable a mobile device to detect that a user is traveling in association with a vehicle based at least on motion data. In some embodiments, accelerometer data is used. Motion data is leveraged in combination with various observations regarding vehicular movement to determine whether or not a mobile device is located in or on the vehicle. For instance, before entering the state of vehicular movement, it can be determined that the user is first in a walking state (e.g., walking to the car, bus, etc., and entering it). Likewise, after exiting the state of vehicular movement, the user re-enters the walking state (e.g., after stepping out of the car, bus, etc., the user again begins walking). Further, it can be determined that when the user is in the walking state, the accelerometer signals appear different to any accelerometer signals seen in the vehicular movement state.

A state machine may be created that captures the above observations, and a Hidden Markov Model (HMM) may be built around the state machine to improve the accuracy of detecting vehicular movement. Various techniques for state machine and HMM construction are provided in further detail below. Further, systems and methods for using such a state machine and HMM are provided below.

DETAILED DESCRIPTION

Figure 1:
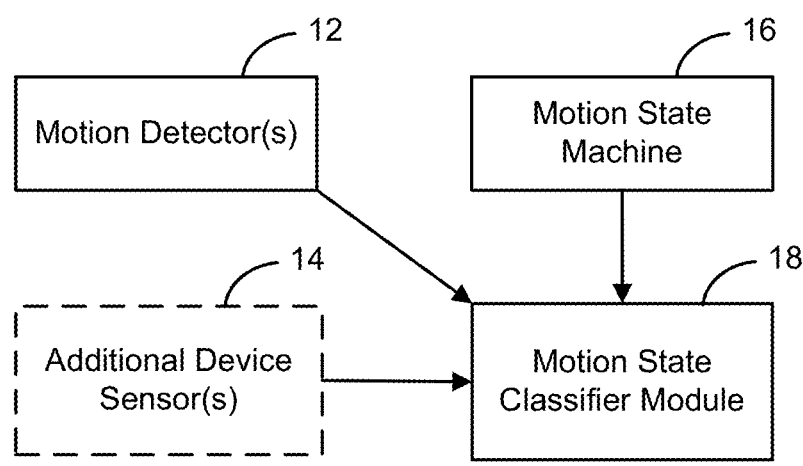
FIG. 1 is a block diagram of a system for mobile device motion state classification according to some embodiments.

The term "likelihood" may refer to a probability or chance of an event occurring, and may be expressed as a probability value, fraction, or percentage. The term "likelihood" as used herein may include the concept of a "probability" as used in mathematics and by persons of ordinary skill in the arts of statistical analysis and state machine modeling and implementations.

The term "present state" or "present motion state" may refer to the current state among a plurality of states in, e.g. a state machine enumerating a series of motion states, e.g. a walk state, run state, autoStop state, autoMove state, etc. Thus, at different moments in time, the present motion state may change or may stay the same.

The term "decision" or "classifier decision" may refer to a determination of what the present state or present motion state is of the apparatus, e.g. mobile device, utilizing the plurality of motion states.

Techniques are described herein for classifying the motion and/or position state of a mobile device, e.g., to determine that a mobile device is located in a vehicle (e.g., car, bus, train, etc.) using a hidden Markov model (HMM) and associated state machine. In some cases this detection can be done using a satellite positioning system (SPS) such as the Global Positioning System (GPS) or the like, by leveraging data relating to the instantaneous speed, the coordinate (e.g., lat/long) trace associated with the device, and so on. However, the current drain associated with running a SPS receiver may make its use prohibitive for vehicular movement detection. Furthermore, SPS-based methods are prone to error in some scenarios. For instance, if the user is moving in traffic at slow speed, SPS information alone may not be sufficient to distinguish walking, running, bicycle riding, skateboarding, rollerblading, skiing, etc., from vehicular transport. Additionally, there are a number of cases where SPS-based detection cannot be performed. For instance, many devices may lack and SPS receiver, and for those devices that include an SPS receiver, the receiver may not be functional when a user has disabled satellite positioning, is in an environment such as an urban canyon in which satellite positioning accuracy and/or reception is poor, is driving in a covered area such as a tunnel, or is traveling in a vehicle in which accurate satellite positioning fixes cannot be obtained, such as on a bus, and/or in other scenarios. Thus, it can be desirable to use other sensors either in addition to, or in place of, SPS to detect vehicular movement.

Embodiments herein may be implemented for any sort of vehicular or moving state, not just for automobiles. Automobiles as described herein are merely just one example of embodiments. For example, embodiments may also include detecting movements on a bicycle, riding a horse, driving a boat, etc. The exact data and methods to detect accelerations may be implemented differently compared to automobiles, but the principles described herein may remain the same.

Some embodiments may determine that a mobile device is stopped based on data from one or more sensors associated with the mobile device. These sensors may include an accelerometer, GPS receiver, or other types of data mentioned in these disclosures. Embodiments may then disambiguate between whether the mobile device is stopped in a vehicular motion state or a pedestrian motion state based at least in part on a previous motion state of the mobile device. In some embodiments, disambiguation may include determining that the mobile device is in the vehicular motion state if an immediately previous state of the mobile device was the vehicular motion state. The disambiguation may be based on probabilistic reasoning from a Hidden Markov Model or other similar stochastic model. Embodiments may then operate an application of the mobile device based on the disambiguating.

One additional sensor that may be used to classify the motion and/or position state of a mobile device, for example to determine whether the mobile device is riding in a vehicle, is an accelerometer. Accelerometer signals may be used in detecting vehicular movement, but it can be difficult to do this based on instantaneous accelerometer information. For instance, if a user is driving on a smooth straight road at constant speed, or is stopped at a traffic light, the accelerometer signals may look very much like they would if the user were sitting in a stationary chair or other location external to a vehicle.

Some embodiments may receive data from one or more sensors. The data may be received at a mobile device or provide the data to the mobile device. Embodiments may then determine a sequence of motion states of the mobile device based on the received data. Embodiments may then determine that the mobile device is in a vehicular state based at least in part on the determined sequence. In some embodiments, the vehicular state comprises a stopped state. In some embodiments, determining that the mobile device is in the stopped vehicular state may include selecting the stopped vehicular state from a plurality of states, wherein the stopped vehicular state is selected only when a state immediately preceding the stopped vehicular state is in a predetermined subset of the plurality of states. In other embodiments, determining that the mobile device is in the vehicular state may include determining that the mobile device has entered a vehicular motion state during the determined sequence, wherein entry into the vehicular motion state is limited to when a state immediately preceding the entry comprises a walk state. In some embodiments, the stopped vehicular state may be selected when the immediately preceding state is a vehicular state where the mobile device is moving. In some embodiments, the one or more sensors may comprise only accelerometers.

FIG. 1 illustrates a system for motion state classification as described herein. One or more motion detectors 12 associated with a mobile device provide raw motion data to a motion state classifier module 18. The motion detectors may be any suitable device for detecting motion, which may provide any type of motion data. In some embodiments, the one or more motion detectors 12 are one or more accelerometers providing accelerometer data. In some embodiments, optical sensors, infrared sensors, ultrasonic wave sensors and the like may be used as a motion detector or to augment motion detection of another sensor. Some embodiments may be implemented in a camera equipped with one or more gyros, the camera adapted to detect motion via accelerometer data or other kinds of motion data. In some embodiments, orientation sensors, described below, may be used as motion detectors. An orientation sensor may include an accelerometer and/or gyro, which may enable embodiments to properly orient itself in three dimensions as well as detect changes in orientation and position. In some embodiments, a camera or image input may be used as a motion detector. For example, a video, series of images, or other input derived from a camera may be used to determine motion of a device coupled to the camera.

The motion state classifier module 18 utilizes the motion data in combination with an associated motion state machine 16 to infer the motion state (e.g., walk, stand, sit, in automobile and stopped, in automobile and moving, etc.) of the mobile device. The motion state classifier module 18 can be configured to output an estimated state at regular intervals (e.g., every 1 s, etc.), continuously, and/or in any other manner. Further, the motion state classifier module 18 can output a discrete state and/or a set of probabilities for respective possible states.

Further, while various examples described herein relate to a system of classifying the state of a mobile device based on accelerometer data alone, the motion state classifier module 18 may also optionally utilize data from one or more additional device sensors 14, such as a GPS receiver, Wi-Fi receiver, an audio input device (e.g., a microphone, etc.), or the like. For instance, GPS and/or Wi-Fi data can be utilized in combination with accelerometer data to provide additional accuracy to position calculations. Additionally or alternatively, the motion state classifier module 18 can be trained to identify audio signatures associated with one or more motion states, which may be utilized as a factor in estimating the motion state of the device. Audio recognition as performed in this manner can be based on a global set of audio signatures or a specific set of audio patterns generated from audio input obtained by the device. Thus, the device may be uniquely trained for audio patterns in one or more environments. In some embodiments the motion state classifier module 18 can be trained to identify other signatures, such as optical, ultrasonic or microwave signatures, for example. Detecting changes in these mediums may also be utilized as a factor in estimating the motion state of the device.

Motion state machine 16 may provide a definition of possible states (e.g., walk, stand, sit, in automobile and stopped, in automobile and moving, etc.) of the mobile device to motion state classifier module 18. Additional examples of possible states may include descriptions in FIGS. 4, 5, 6, and 7. Classifier module 18 may then keep track of what is the current state, based on data from motion detector(s) 12 and any additional data from sensor(s) 14. Module 18 may also determine a change in state based on motion data from motion detector(s) 12 and any additional sensor(s) 14, using the transitions and types of states provided by state machine 16.

Figure 2A:
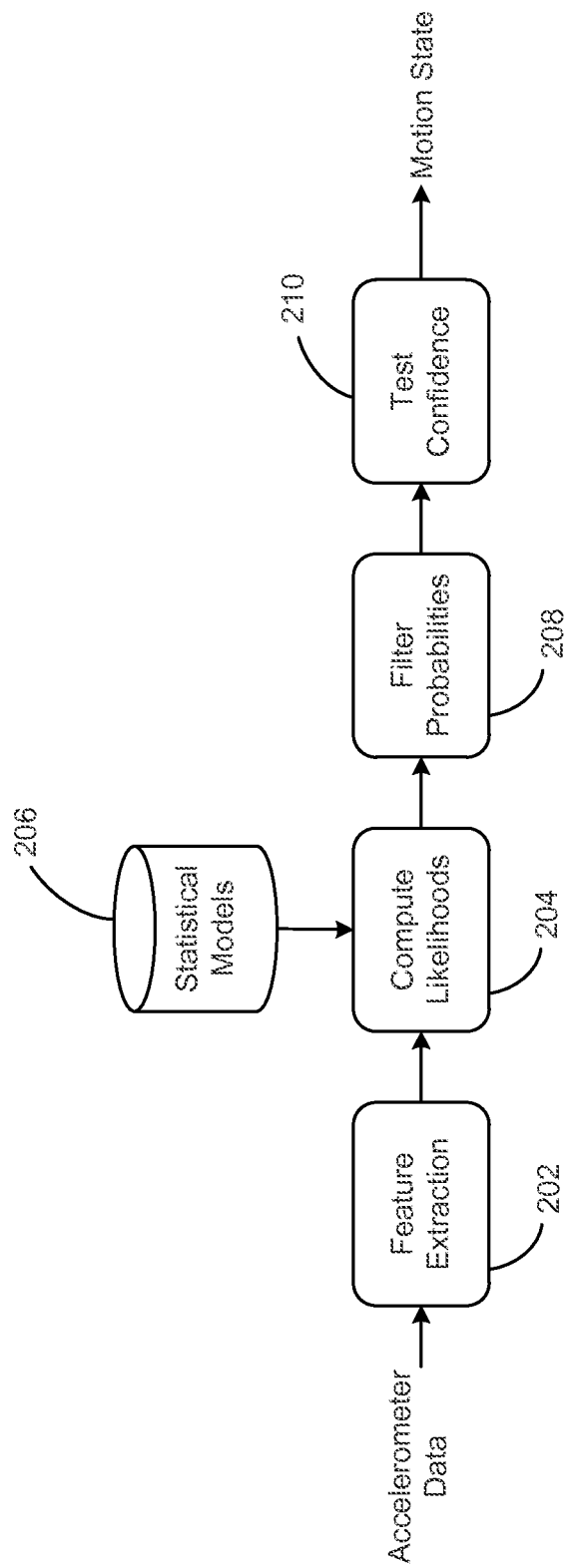
FIGS. 2A, 2B, and 3 are block diagrams of example device position classifiers according to some embodiments.

The motion state classifier module 18 may infer a drive motion state associated with a mobile device using a Bayesian classifier for activity recognition. For instance, a Motion State Device Position (MSDP) classifier as illustrated in FIG. 2A may be utilized to obtain a state classification decision, or a present state, corresponding to a mobile device. As shown in FIG. 2A, features extracted from accelerometer data using feature extraction module 202 are processed using a set of statistical models 206 to compute a set of likelihoods using module 204 for various device states. Example features extracted at module 202 may include acceleration values over time, standard deviation values (sa), ratios of the mean of normal to normal of mean values of the accelerometer data (rm), pitch values (pitch), rotation values (phi), etc. Example statistical models stored in module 206 may include a joint Gaussian Markov Model (GMM) over each motion state-device position combination, or other types of stochastic Markov Models suitable to those with ordinary skill in the art.

These models may apply the data from the feature extraction module to compute a set of likelihoods reflecting probabilities of what state the user is in, at module 204. The output set of likelihoods may be a vector of probabilities encompassing each of the possible device states, where the individual probabilities sum to 1. Additionally or alternatively, the output set of likelihoods may include discrete values corresponding to most likely states at given periods of time. The likelihoods are then passed to a filtering block 208, which utilizes a latency factor L to stabilize the determined device states. For instance, the filtering block 208 can set a state at a given time to a most frequently seen state over the past L seconds. Additionally or alternatively, weighted averages and/or other algorithms can be used to process vector likelihood data into a filtered set of states and/or state likelihoods. The filtered states are then provided to a confidence test block 210 which removes low confidence decisions, as a result of which the device state is output as the most likely state identified by the filtering block 208. In the event that a decision is removed for low confidence, the classifier may output a default state, an "unknown" state, and/or any other suitable state(s). After verifying the confidence of each state at block 210, embodiments may output what state the user may be in. Examples may include walk, run, sit, stand, fiddle, rest, or driving motion states.

Figure 2B:
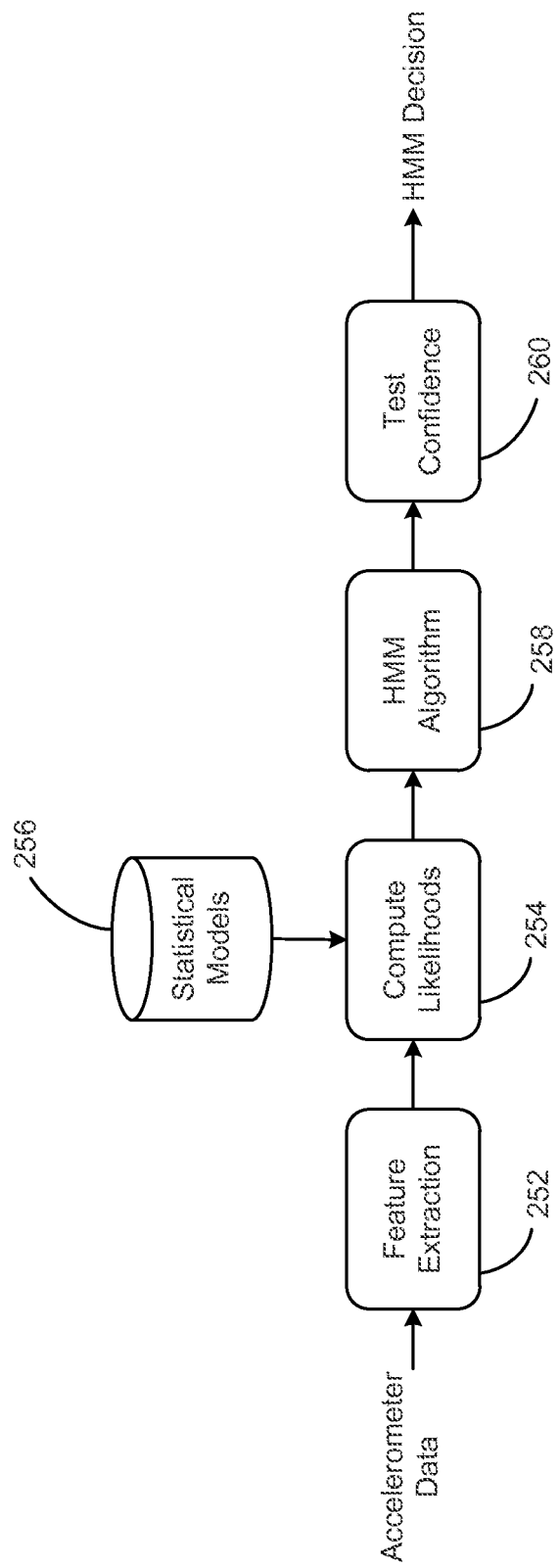

In addition to, or in place of, the classifier shown in FIG. 2A, a classifier as illustrated in FIG. 2B can be utilized, in which a Hidden Markov Model (HMM) algorithm is utilized to process computed state likelihoods. Embodiments according to FIG. 2B may utilize a feature extraction module 252, statistical models module 256, and compute likelihoods module 254 that may function the same as or similar to modules 202, 206, and 204 in FIG. 2A, respectively. In some embodiments, these modules may function differently than described in FIG. 2A in that data is extracted relevant to a HMM algorithm and/or module. For example, the likelihoods computed at block 254 may be emission probabilities used in a HMM algorithm and/or module. In other embodiments, a support vector machine (SVM) may be used in block 254 to compute likelihoods. An SVM classifier may output hard decisions (e.g. either walk or not walk, drive or not drive, etc.), but may be modified to output soft decisions (e.g. likelihood values). Other variations may include the feature extraction module 252 extracting most or all types of data received from the accelerometer, such that the feature extraction module 252 performs minimal filtering operations while passing along a maximal amount of data for later modules to be able to consider. Other types of models, state machines, or classifiers may be used. For example, a HMM, GMM, etc. may be replaced with other techniques/modules, such as a Poisson hidden Markov model, hidden Bernoulli model, and other stochastic models readily apparent to those with ordinary skill in the art.

The outputs of block 254 may be used in HMM Algorithm block 258. HMM algorithms that can be utilized include, but are not limited to, a Viterbi algorithm (e.g., maximum likelihood (ML) sequence estimation), forward-backward chaining (e.g., ML state estimation), etc. In one implementation, in the event that discrete states are passed as input to the HMM algorithm or module, the HMM algorithm or module can estimate system noise and process the state inputs based on the estimated noise. At Test Confidence block 260, a similar check to remove states that fail the confidence check as described for block 210 may be utilized. Differences may involve evaluating conclusions based on a HMM algorithm or module as opposed to other kinds of statistical models illustrated in FIG. 2A. After verifying which states have a high degree of confidence, the remaining outputs may be passed along as an HMM decision.

Figure 3:
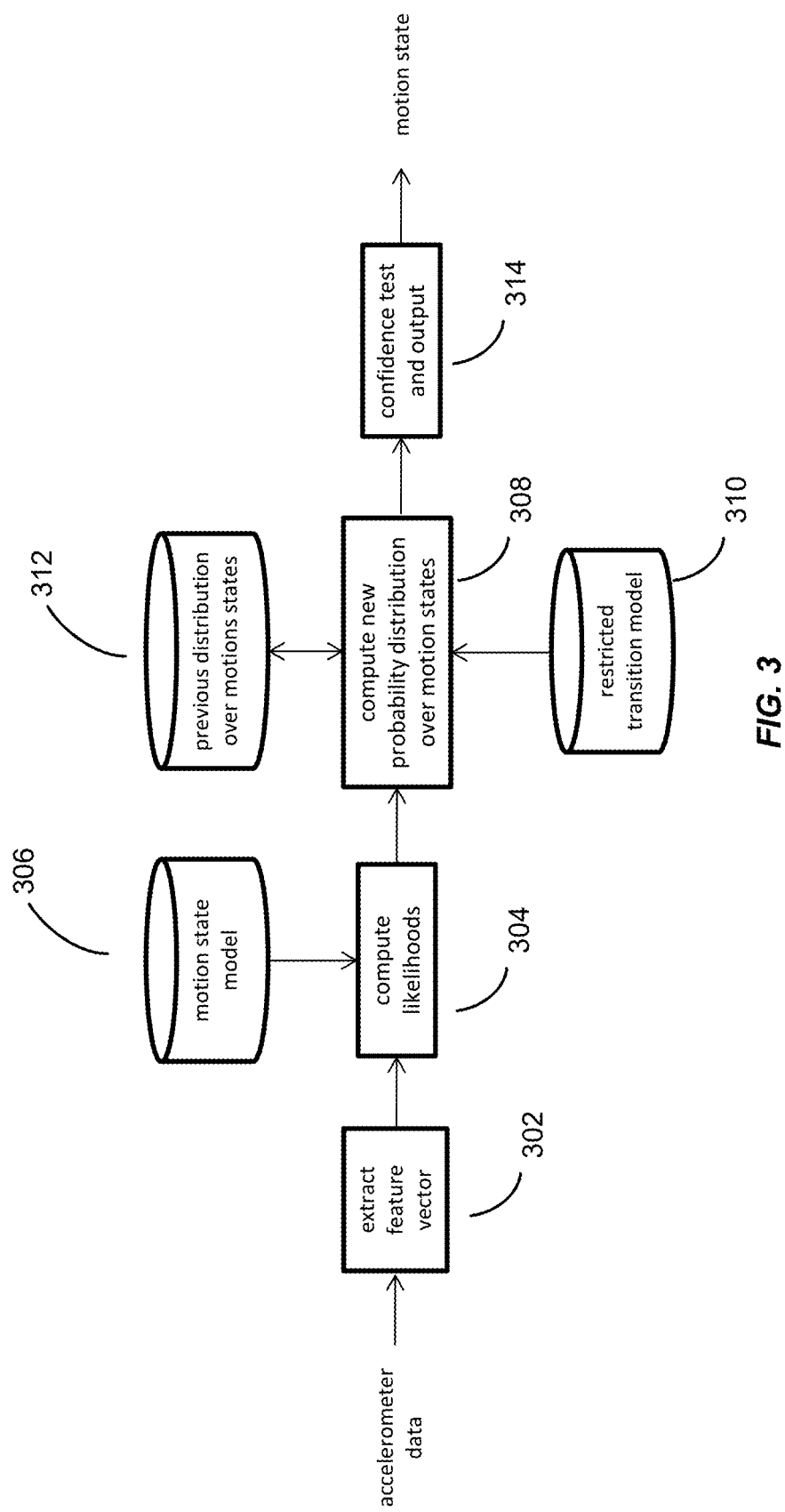

Referring to FIG. 3, yet another example classifier according to some embodiments is illustrated. Extract feature vector block 302, compute likelihoods block 304, motion state model 306, and confidence test and out block 314 may be the same or similar to their respective blocks in FIGS. 2A and 2B. Block 308 may consider computed likelihoods 304 and previous probability distribution over motion states at block 312, and compute a new probability distribution over the motion states using at least one restricted transition model 310. Examples of a restricted transition model in block 310 may include what is described in FIG. 4, explained further below. In this example, embodiments may iteratively update a set of probabilities as new data is gathered from an accelerometer.

The classification techniques performed by the classifiers shown in FIGS. 2A, 2B and 3 above, as well as other classification techniques described herein, may be performed in real-time, or alternatively data may be saved for later execution. Further, the classifier can set the latency factor L to balance accuracy against responsiveness. For instance, large values of L will increase accuracy while smaller values of L will increase classification speed and responsiveness. For example, setting L to a processor-equivalent of infinity may yield the highest accuracy in some embodiments. If the data is saved for later execution, L may be adjusted to achieve the desired accuracy. Thus, data may be processed in real time, saved for later analysis, or analyzed using a combination of concurrent and post-processing.

As noted above, to detect that a user is riding in a vehicle, the following observations can be used. First, before entering the state of vehicular movement, it may be observed that the user is first in the walk state (e.g., the user walks to the car, bus, etc., and enters it). Likewise, after exiting the state of vehicular movement, the user re-enters the walk state (e.g., after stepping out of the car, bus, etc., the user again walks). Second, when the user is in the walk state, the accelerometer signals appear significantly different to any signals seen in the vehicular movement state.

Thus, a state machine that captures the above observations may be utilized, and a HMM may be built around it to improve the accuracy of detecting vehicular movement. The HMM resides above a lower level classifier, which at each time instant, $t=1, 2, \ldots$, outputs a likelihood value $p(x(t)|\omega_i)$ for lower level motion states $\omega_i$. For example, $\omega_1$=walk, $\omega_2$=run, $\omega_3$=sit, $\omega_4$=stand, $\omega_5$=fiddle, $\omega_6$=rest, $\omega_7$=autoStop, $\omega_8$=autoMove. Each lower level motion state has a model $p(\cdot|\omega_i)$ associated with it, which may be generated from training data. When the HMM detects the state is either autoStop or autoMove, it concludes that the user is in the higher level state of auto (vehicular movement).

The model autoStop state can be created from training accelerometer data when a user is sitting in a car, bus, etc., that is either parked or stationary. Likewise, autoMove can be trained from accelerometer data collected when a user is moving in a car, bus, etc. Alternatively, the model for autoStop may be adapted from the model for sit.

Training data for the autoStop and autoMove states can be collected, for example, by recording both accelerometer signals and regular GPS fixes (e.g., one per second) for a user riding in a vehicle, and then using the GPS fixes to determine, for each time instant, whether the ground truth is autoStop or autoMove. As another example, a user of the mobile device may manually select a state to associate with recorded accelerometer signals. An example training method may include calibrating a database of accelerometer signals to be associated with certain types of states, e.g. autoStop, autoMove, walk, run, etc., and then providing the database for users utilizing the mobile device containing the database. Another example may include a user manually training embodiments by specifying what state the user is actually in, while embodiments may note the types of accelerometer data being received during those states. Other examples may include some combination of these two example methods, including manual calibrations being made to a pre-calibrated database. Other types of training methods are certainly possible, and embodiments are not so limited.

With respect to the model utilized for motion state classification as described herein, the model may be determined in various manners. For instance, the model may be determined at the mobile device, e.g., by way of training or observation. Additionally or alternatively, the model may be determined externally and loaded onto the mobile device. For instance, the model may be provided to the device by way of a processor-readable storage medium, received over a network (e.g., by downloading an associated application), created in advance and pre-installed at the device, etc.

Figure 4:
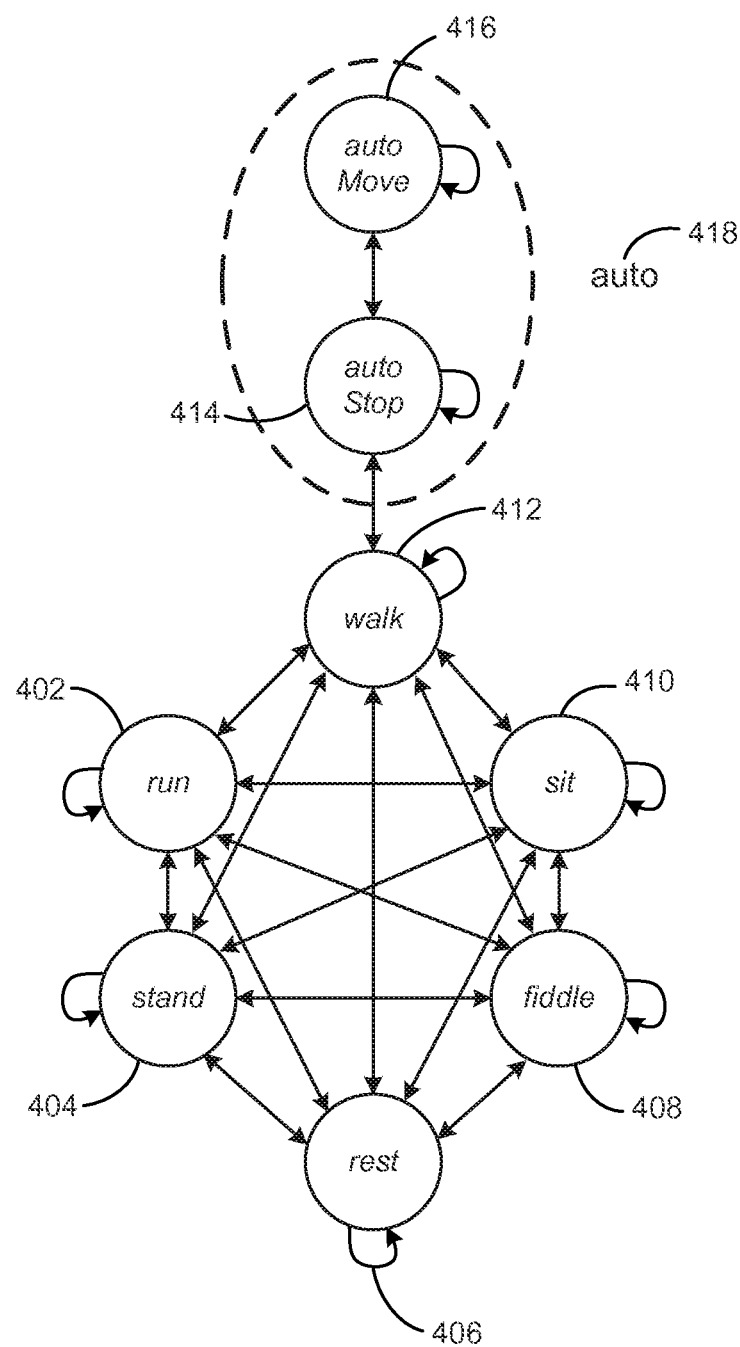
FIGS. 4-5 illustrate example state diagrams for motion state classification according to some embodiments.

An example state machine according to some embodiments is illustrated in FIG. 4. The example state machine in FIG. 4 may be considered a restrictive transition model, in that the number of states are finite, all of the states are known, and the transitions between each state are also clearly defined. In this example, eight states are shown, with six states in pedestrian non-auto states (run state 402, stand state 404, rest state 406, fiddle state 408, sit state 410, and walk state 412), and two states 418 in an automobile (autoStop state 414, and autoMove state 416). Among the non-auto states, any transitions are allowed—including back to the same state, but among the auto states 418, the only allowed transitions are autoMove-autoStop and autoStop-walk. Thus, in the example shown in FIG. 4, the walk state always precedes entry into the higher level state of auto, and always immediately follows exit from the higher level state of auto.

The HMM of some embodiments may facilitate the disambiguation of sit and autoStop states by remembering the previous state. Thus, if the user is driving and comes to a stop at a traffic light, the HMM will report autoStop rather than sit, as the previous state was autoMove and it is not possible to transition from autoMove to sit. Similarly, when the user exits the vehicle, the HMM will report the sequence autoStop→walk, which can then be followed by sit.

The transition probability matrix for the state machine in FIG. 4 can be represented in various manners. For instance, the self-transition probability for each state can be represented as a constant, with the probability of transitioning to a different state being uniformly spread among the feasible transitions. As another example, the transition probability matrix can be based on training data by, e.g., storing examples of each state (e.g., of length 1 second, etc.) in a local or remote database and comparing the accelerometer signals to the stored database samples to determine the probable states. Other transition probability matrices with different parameterizations, conforming to FIG. 4, are also possible.

An example of a transition matrix that may be employed for the state machine in FIG. 4 according to some embodiments is illustrated in Table 1 below.

TABLE 1

Example transition matrix for a motion state classifier.

| $P(a_n|a_{n-1})$ | walk | run | sit | stand | fiddle | rest | autoMove | autoStop |
|---|---|---|---|---|---|---|---|---|
| walk | 0.9 | 0.0167 | 0.0167 | 0.0167 | 0.0167 | 0.0167 | 0 | 0.0167 |
| run | 0.02 | 0.9 | 0.02 | 0.02 | 0.02 | 0.02 | 0 | 0 |
| sit | 0.02 | 0.02 | 0.9 | 0.02 | 0.02 | 0.02 | 0 | 0 |
| stand | 0.02 | 0.02 | 0.02 | 0.9 | 0.02 | 0.02 | 0 | 0 |
| fiddle | 0.02 | 0.02 | 0.02 | 0.02 | 0.9 | 0.02 | 0 | 0 |
| rest | 0.02 | 0.02 | 0.02 | 0.02 | 0.02 | 0.9 | 0 | 0 |
| autoMove | 0 | 0 | 0 | 0 | 0 | 0 | 0.98 | 0.02 |
| autoStop | 0.05 | 0 | 0 | 0 | 0 | 0 | 0.05 | 0.9 |

As shown in Table 1 above, self-transition probabilities are higher, since typically an activity persists for an extended period of time (e.g., longer than 1 second). Further, all transition probabilities from the auto states to the pedestrian states are 0 except for transitions between walk and autoStop, as the only way to enter the autoMove state is by transitioning from walk to autoStop, and the only way to exit the autoMove state is by transitioning from autoStop to walk. Further, Table 1 illustrates that self-transition probabilities are set to relatively high values to discourage rapid state oscillations, which may lead to classifier errors. The specific probabilities used can be based on, e.g., the anticipated time within a given state. For instance, the autoMove state is given the highest self-transition probability in Table 1 since it is anticipated that the user will remain in the autoMove state for long periods of time.

Figure 5:
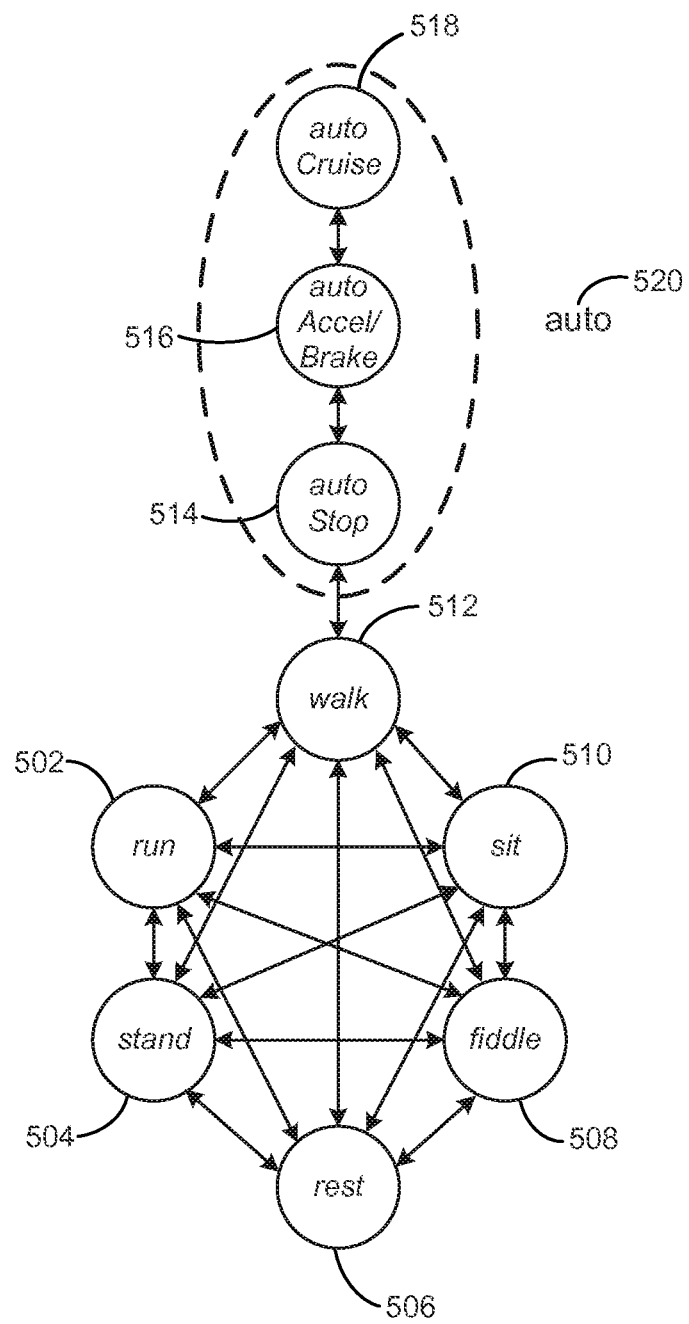

Variants of the state machine in FIG. 4 can also be used. For instance, FIG. 5 illustrates a variant state machine which differentiates between accelerating/braking and cruising, in autoAccel/Brake state 516 and autoCruise state 518, respectively. Other states as shown may be similar to those in FIG. 4, including run state 502, stand state 504, rest state 506, fiddle state 508, sit state 510, and walk state 512, and autoStop state 514. As shown in FIG. 5, restriction between auto states 520 and other states can be enforced similarly to that described above for FIG. 4. Certainly, not all states as shown need be utilized or present in all embodiments, and the states shown are merely examples. Additionally, there could be more states or sub-states not shown, and embodiments are not so limited. For example, embodiments may include just a single state to represent a user is acting as a pedestrian, and then one or more vehicular states. In another example, there may be a restriction/gateway between a pedestrian motion and a vehicular motion.

The performance of an HMM-based driving detector according to some embodiments can be further improved through the use of an extended state machine. The extended state machine breaks one or more existing states into a set of consecutive sub-states which the system must pass through before exiting that state. This adds stickiness to the system by reshaping the distribution of the state duration (the amount of time spent in a state before transitioning). For instance, even in the presence of heavy biasing against state transitions, the state of a mobile device may still oscillate between different states. Thus, the extended state machine provides a number (e.g., 2, 3, 5, etc.) of sub-states within each individual state, each with its own rules for transitioning. Examples of extended state machines are given in FIG. 6 and FIG. 7. Here, each original state i is broken into $N_i$ sub-states. This forces the HMM to pass through several intermediate sub-state transitions before changing state, which has the net effect of reducing or eliminating rapid fluctuations.

Figure 6:
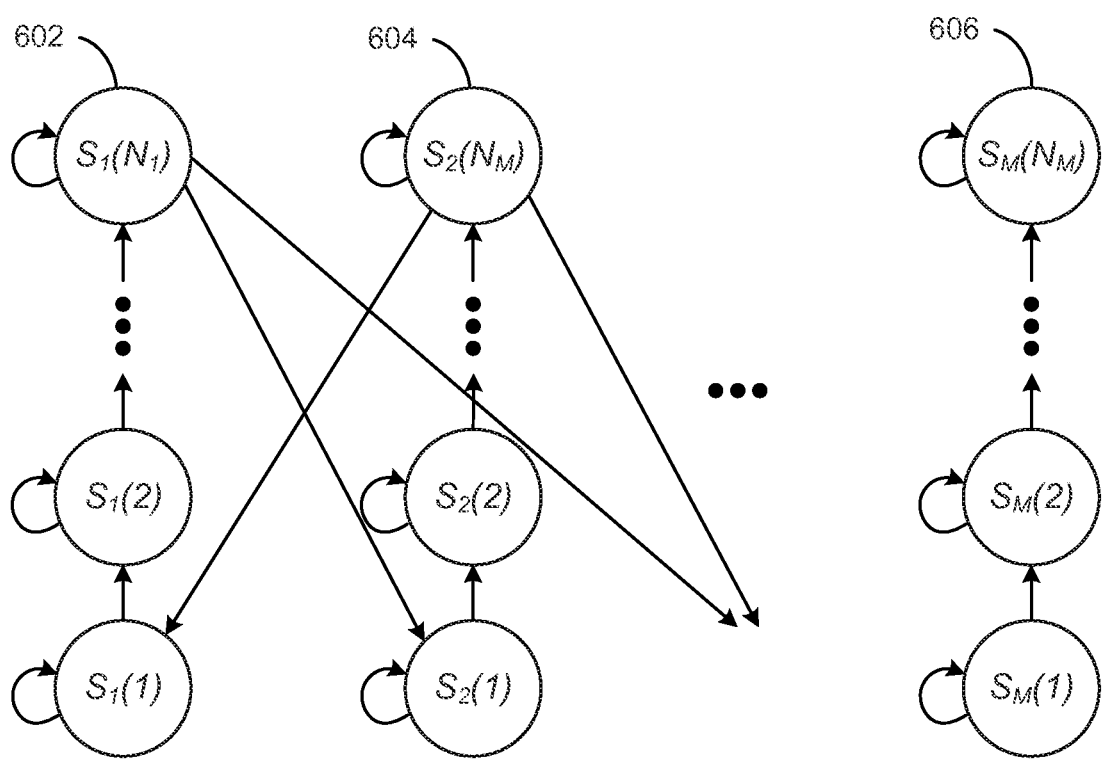
FIGS. 6-7 illustrate example extended state machines for motion state classification according to some embodiments.
Figure 7:
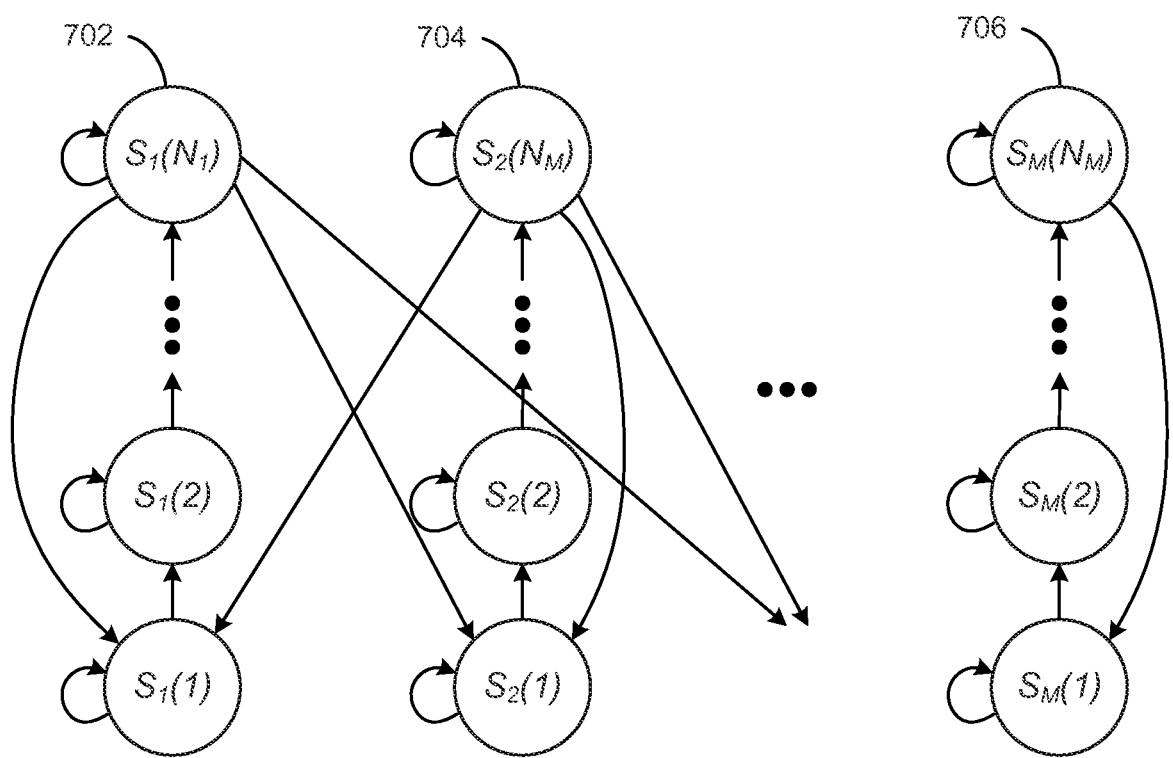

As shown in FIGS. 6-7, respective columns represent a single state. For example, referring to FIG. 6, column 602 may represent the run state 402 or 502, column 604 may represent the walk state 412 or 512, and column 606 may represent the sit state 410 or 510. As further shown, a transition from one state to another state can only occur within the final sub-state of a given state. Thus, to move from one state to another state, the state transition must be indicated N times in a row, which reduces false positive probability. Other sub-state configurations could also be used.

Still referring to FIG. 6, in this example, column 602, representing run state 402 or 502, may have at least three sub-states. Each sub-state may represent a series of decelerations, which may signal to embodiments that the user is transitioning from the run state to another state, e.g. walk state, sit, etc. The series of decelerations as represented in the at least three sub-states of column 602 may be useful for determining whether the user is merely reducing speed while running as opposed to reducing speed to the point of walking or stopping. Similarly, the walk state column 604 and sit state column 606 may be sub-divided into a series of sub-states, each sub-state reflecting a series of acceleration readings or values indicative of transitioning from that state to another state.

Referring to FIG. 7, state transitions 702, 704, and 706 may include sub-state transitions as shown, and may also include the ability to transition back to the start of the sub-state transitions of the same state. Transitioning to the beginning of the sub-state transitions may be consistent with the ability of states shown in FIGS. 4 and 5 to transition back to themselves. In other embodiments, like in FIG. 6 for example, the ability to transition back to the same state may be reflective simply in the fact that each sub-state may be able to transition back to itself. However, these are merely examples.

Additionally, states may have different numbers of sub-states depending on various factors, such as anticipated time within a given state or the like. For instance, a greater number of sub-states can be used for those states that users typically dwell in for longer durations. By way of specific, non-limiting example, 5 sub-states may be used for each of walk, run, sit, stand, fiddle, rest, and autoStop, and 12 sub-states for autoMove. Other sub-state configurations are also possible.

Regardless of the particular state model used, at each time instant t=1, 2, . . . , the HMM takes as input a set of likelihood values $p(x(t)|\omega_i)$ for the current time t at times t=1, 2, . . . . The HMM of some embodiments outputs K posterior values $p(\omega_i|x(t-L))$ corresponding to the probability of being in each state $\omega_i$ at time t−L (i.e., L time steps ago), where K is the number of lower level states and L is a tunable parameter corresponding to the system latency. In order to do this, the HMM stores the L−1 previous values of $p(x(t)|\omega_i)$ for each state. It can be noted that storage and other computation requirements do not grow with time.

With further reference to the techniques above according to embodiments, improved drive detection can be realized as follows. When a car stops at a stoplight, it is observed that the classifier as described above may output a result of sit or stand. Thus, to improve auto state detection in this instance, temporal consideration is introduced that looks at both current and past data to make a decision. This may be done using a duty cycled approach and/or a non-duty cycled approach. For the duty cycled approach, sensors are logged for only the first x seconds of every y minutes (e.g., where x=15 sec and y=2 min, etc.) in order to realize power savings on the device. In such an approach, a GPS sensor may also be used, which in some cases (e.g., associated with a non-duty cycled approach) would consume too much battery life.

Figure 8:
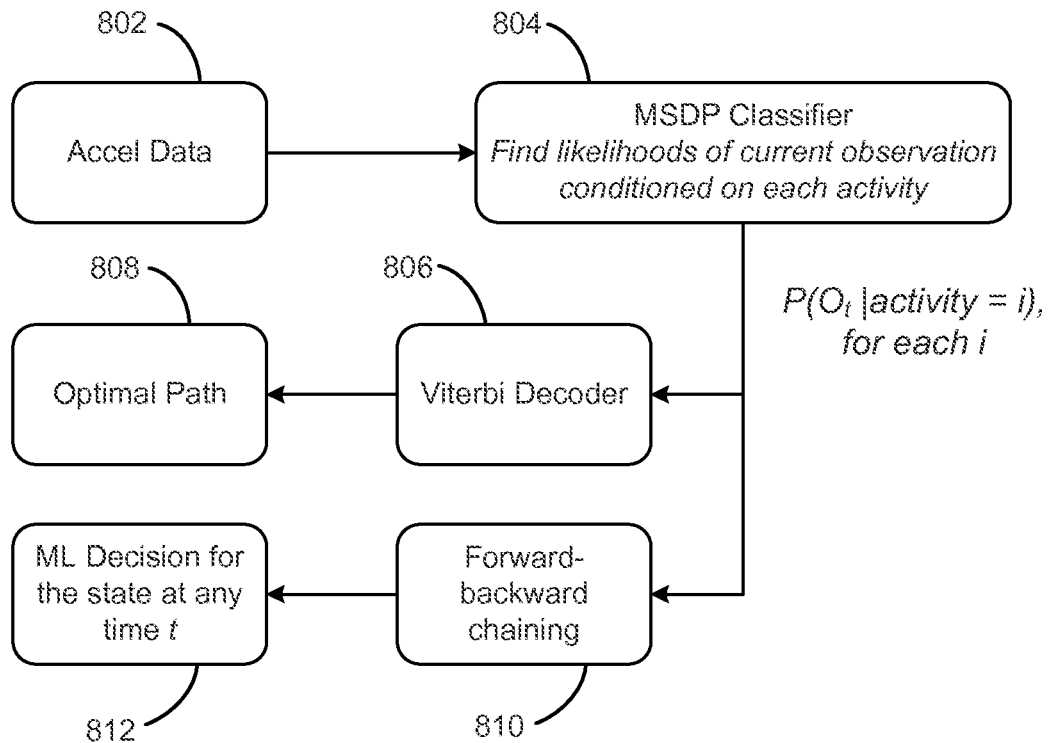
FIG. 8 is a block diagram of another example device position classifier according to some embodiments.

Alternatively, for a non-duty cycled approach, sensors are logged continuously. In this case, a state model, such as a HMM as discussed above, can be utilized based solely on accelerometer data. An example classifier for a non-duty cycled approach is illustrated by FIG. 8. Here, accelerometer data 802 is an input to MSDP classifier 804. The classifier 804 may be the same as or similar to classifiers described in FIG. 2 or 3. Classifier 804 may output probabilities P, that the user is detected to be in a current state $O_t$, given that the user is actually conducting activity i, for each i, expressed as $P(O_t|activity=i)$, for each i. These probabilities may then be used as inputs to Viterbi Decoder 806 and Forward-backward chaining module 810, each having an example latency L. Of course, embodiments are not limited to these examples.

Various algorithms can be performed for an input data stream to obtain output parameters corresponding to classified states. For instance, a forward-backward chaining algorithm 810 can be utilized to provide a probability vector of posterior values 812 for various states at each time instance. Alternatively, a Viterbi algorithm 806 can be utilized to provide a most likely state sequence 808 given the input data from block 804.

Results provided in the form of state probabilities can be further improved through the use of confidence testing. For example, at each time t, the driving detection decision may be discarded if the posterior probabilities of the two most probable states are comparable to one another (corresponding to a high degree of uncertainty in the decision). Discarding of decisions is based on a confidence threshold, which can be based on a minimum acceptable difference between most probable states, and/or any other suitable factor(s). Examples of confidence testing may be shown in FIGS. 2 and 3.

To improve drive detection as described above, various additional features and parameters can be introduced. For instance, spectral entropy (se) can be defined as the entropy of the distribution obtained by normalizing the FFT, e.g., $se=-\Sigma p(x)\log p(x)$, were $p(x)=|\text{fft}(\sqrt{a_x^2+a_y^2+a_z^2})|$. Further, a mean of norms (mn) can be defined as the mean of the norm of accelerometer values over the main window of 1 s, e.g., $$mn = \frac{1}{N} \sum_{i=1}^{N} \sqrt{a_x^2 + a_y^2 + a_z^2}.$$

In many circumstances, over a given window of 1 s the normal of the accelerometer data remains near to 1 g for sitting, but it may change for driving.

Further, various GPS rules can be utilized to enhance classifier decisions in the duty cycled approach. First, an instantaneous velocity rule can be implemented, where for the instantaneous velocity v, (1) if v>0.25 m/s, the likelihood of sit and stand is made small; (2) if v>3 m/s, the likelihood of walk is made small; and (3) if v>8 m/s, the likelihood of run is made small. Additionally, a distance rule can be implemented wherein, for a distance d between the current position and the average position during the last sampling run, if d>200 m, the likelihood of sit and stand is made small. The particular thresholds used can be based on general observations, training, and/or data pertaining to a particular user and may differ from those used above.

As noted above with reference to the example state diagrams in FIGS. 4-5, the autoMove state can only be reached through autoStop, and the autoStop state can only be reached through walk. All other activities may freely transition between each other. However, in some cases autoStop and sit may be trained in the state classifier as the same class. Thus, a penalty factor can be applied to the probability of autoStop before giving it to the HMM in order to reduce the probability of said state prior to application of the HMM.

As a result of robust mobile device driving detection as described above, various automated applications are enabled. These include, but are not limited to, the following:
1) Switching of user interface to drive mode. For example, embodiments may detect that the user has entered a driving state, e.g. autoMove, and therefore implements pre-configured settings on the mobile device to enable voice-activated commands as default operations as opposed to touch commands.
2) Diversion of voice calls to mail box with appropriate message, e.g. "Can't answer phone as currently driving, please leave a message." This setting may be in addition to or included with the drive mode described in example (1), above.
3) Response to SMS, e.g., "Driving . . . can't reply now." This may be another example of how embodiments may respond to phone calls or other messages once it is determined the user has entered a driving state.
4) Monitoring/feedback on driving habits, notification of speeding, erratic driving, etc. For example, embodiments may additionally monitor motion state data, once the user has entered a driving state, and may make determinations based on the motion state data whether the user is driving erratically, e.g. the user is drunk. In other examples, embodiments may record statistics for a driver's habits, e.g. what is a typical driving speed, how quickly or slowly does the driver accelerate or decelerate, etc. Such data may be helpful to help improve driving habits and/or design vehicles more suitable to such driving habits. Further, such data may be used by insurance companies to determine or adjust a rate charged for coverage.
5) Enabling of in-car radio service and/or other services such as navigation. For example, an in-car radio may have the volume adjusted to be louder or quieter, depending on if it is determined the vehicle is in a moving state or a stopped state. In another example, navigation services may be turned on once it is determined the vehicle is in a moving state.
6) Reminder triggers (e.g., pick up listed items from the store). For example, visual or audio reminders may be posted to the user when it is determined the vehicle is starting to move from a parked state.
7) Social network updates (e.g., "Driver is currently driving to . . . "). For example, embodiments may be configured to automatically send updates to social network websites and the like, in order to share changes in statuses based on the driving state associated with the user.

The examples above are merely illustrative, and embodiments are not so limited. Of course, other examples apparent to those with ordinary skill in the art may be included in embodiments.

Thus, the determined state of the mobile device may be used to alter or toggle the operation of one or more applications, for example that are being executed by the mobile device, or system controls or configurations of the mobile device. The determined state may also affect the operation or state of devices or applications that are remote from the mobile device. For example, when the mobile device determines that is in a vehicular state, a signal or notification may be transmitted, for example over a wired or wireless network, to a remote location. The signal may indicate that a user of the mobile device is driving home and cause lights or a heater to turn on in the user's house; may cause a busy status to be set at the user's place of work; or may indicate to the user's child or to an administrator at the child's school, for example by text message or other alert, that the user is en route to pick the child up. Of course, the above circumstances are only examples and are not limiting.

Figure 9:
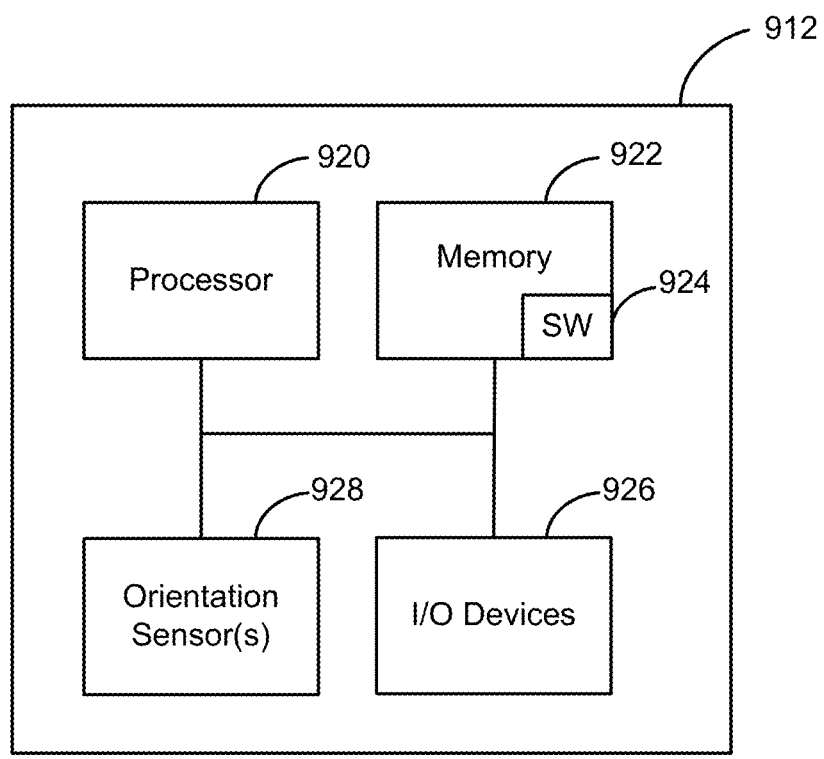
FIG. 9 illustrates example components of a computing device of some embodiments.

Referring to FIG. 9, an example computing device 912 comprises a processor 920, memory 922 including software 924, input/output (I/O) device(s) 926 (e.g., a display, speaker, keypad, touch screen or touchpad, etc.), and one or more orientation sensors 928, such as accelerometers. Additionally, the device 912 may include other components not illustrated in FIG. 9, such as a network interface that facilitates bi-directional communication between the device 912 and one or more network entities, and/or any other suitable component(s).

The processor 920 is an intelligent hardware device, e.g., a central processing unit (CPU) such as those made by Intel® Corporation or AMD®, a microcontroller, an application specific integrated circuit (ASIC), etc. The memory 922 includes non-transitory storage media such as random access memory (RAM) and read-only memory (ROM). The memory 922 stores the software 924 which is computer-readable, computer-executable software code containing instructions that are configured to, when executed, cause the processor 920 to perform various functions described herein. Alternatively, the software 924 may not be directly executable by the processor 920 but is configured to cause the computer, e.g., when compiled and executed, to perform the functions.

The orientation sensors 928 are configured to collect data relating to motion, position and/or orientation of the device 912 as well as changes in such properties over time. The orientation sensors 928 can include, e.g., one or more accelerometers, gyroscopes (gyros), magnetometers, or the like. The orientation sensors 928 are configured to provide information from which the motion, position and/or orientation of a device 912 can be determined. Respective orientation sensors 928 associated with a device 912 can be employed to measure a single axis or multiple axes. For multi-axis measurement, multiple single-axis accelerometers and/or multi-axis (e.g., two-axis or three-axis) accelerometers can be employed to measure motion with respect to linear axes (e.g., x-y-z, north-east-down, etc.), and multiple single-axis gyroscopes and/or multi-axis gyroscopes can be employed to measure motion with respect to angular axes (e.g., roll, pitch or yaw).

The orientation sensors 928 can provide information over time, e.g., periodically, such that present and past orientations, positions and/or motion directions can be compared to determine changes in the motion direction, position and/or orientation of the device 912. A gyroscope can provide information as to motion of the device 912 affecting the orientation. An accelerometer is configured to provide information as to gravitational acceleration such that the direction of gravity relative to the device 912 can be determined. A magnetometer is configured to provide an indication of the direction, in three dimensions, of magnetic north relative to the device 912, e.g., with respect to true north or magnetic north. Conversion mechanisms based on magnetic declination and/or other suitable means can be utilized to convert a direction with respect to true north to a direction with respect to magnetic north, and vice versa.

Various elements of the classifier systems illustrated and described herein can be performed by a computing device such as device 912 in FIG. 9. For instance, with reference to FIG. 2A, the feature extraction block 202, likelihood computation block 204, filtering block 208, and confidence testing block 210 can be implemented by a processor 920 executing instructions stored as software 924 on a memory 922. Further, the accelerometer data and/or statistical models 206 used as shown in FIG. 2A can also be stored on the memory 922. Further, with reference to FIG. 2B, the feature extraction block 252, likelihood computation block 254, HMM algorithm block 258, and confidence testing block 260 can be implemented by a processor 920 in a similar manner to the blocks shown by FIG. 2A. Further, the accelerometer data and statistical models 256 can be stored on the memory 922 in a similar manner to that described with respect to FIG. 2A. A similar construction may be able to implement the descriptions of FIG. 3. With reference to FIG. 8, the MSDP classifier 804 can be implemented by a processor 920 executing instructions stored on a memory 922 in a similar manner to various elements shown by FIGS. 2A, 2B and/or 3. Similarly, the Viterbi decoder 806 and forward-backward chaining blocks 810 shown in FIG. 8 can also be implemented via a processor 920.

The classifier implementations described in the preceding paragraph are provided as examples and are not intended to limit the subject matter described and claimed herein. For instance, one or more of the functional elements illustrated in FIGS. 1, 2A, 2B, 3, and/or 9 may be implemented in hardware (e.g., using standalone hardware elements, etc.), software, or a combination of hardware and/or software in any suitable manner. For example, a hardware implementation according to some embodiments may use state restrictions to determine what the motion state is, and how states may transition from one state to the next. Date may be stored in non-volatile memory, the data representing a probability distribution of the states. Over time, the data may be updated to reflect current and previous states. For example, embodiments may store a previous state in hardware, then update one or more probability distributions using a probability distribution model as described in these disclosures. This way, only the current state and the previous state need be recorded. In some embodiments, the memory 922 may store a motion state machine 16 as described in FIG. 1. I/O devices 926 may receive data from motion detectors 12 and optionally additional device sensors 14. In other embodiments, orientation sensors 928 may correspond to the motion detectors 12 and device sensors 14. Processor 920 may include motion state classifier module 18 and may process data received at motion detector 12 and additional sensors 14 in order to determine current and transitioning states as defined by state machine 16. Other hardware or software techniques used to implement the disclosures herein may be readily apparent according to persons having ordinary skill in the art, and embodiments are not so limited.

Embodiments may be implemented at varying levels of computer architecture in hardware/software/firmware, etc. For example, embodiments may be implemented as a software application, which may be configured to access multiple motion sensor peripherals. In another example, embodiments may be implemented as a hardware implementation, such as with a series of hardware states in a state machine. An application program interface (API) layer may then access the hardware states. As another example, some embodiments may be implemented as part of a high level operating system (HLOS), or may be accessible to the HLOS, for example through and API. Other implementations are possible, and embodiments are not so limited.

Figure 10:
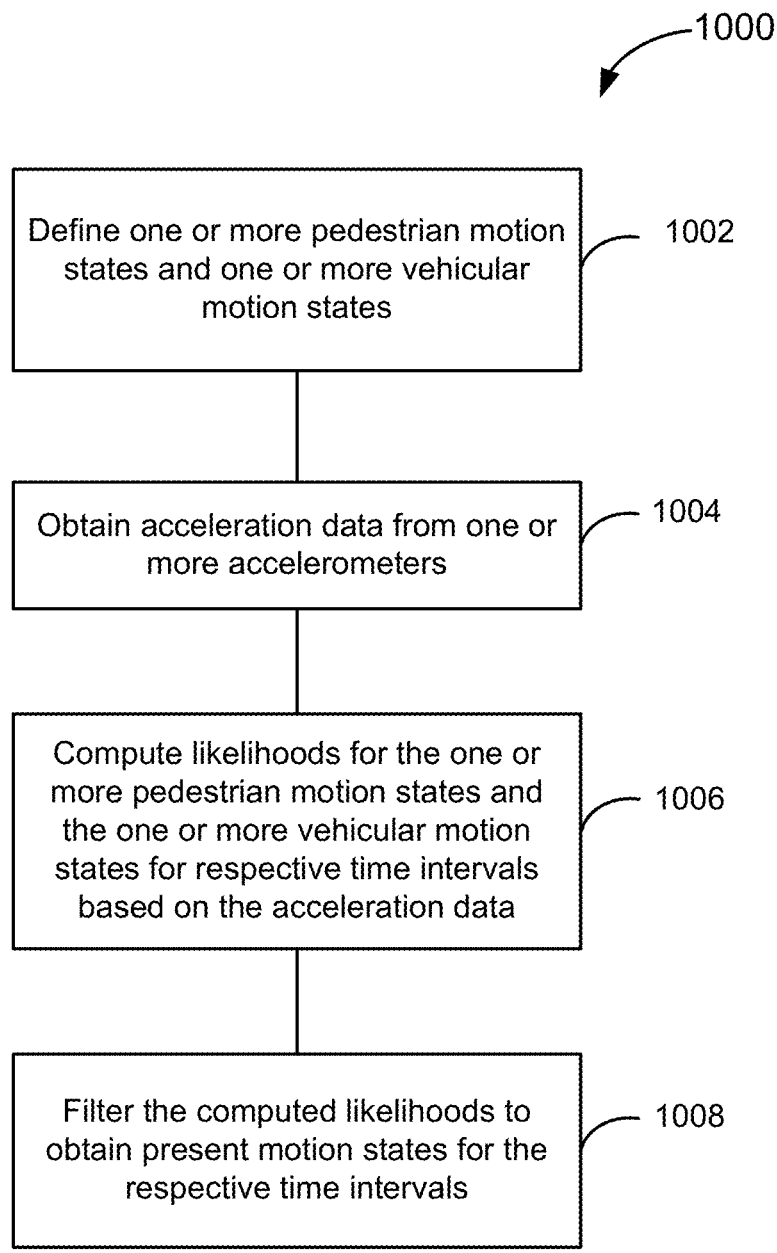
FIG. 10 is a block flow diagram illustrating a process of classifying the motion state of a mobile device according to some embodiments.

Referring to FIG. 10, with further reference to FIGS. 1-9, a process 1000 of classifying the motion state of a mobile device includes the stages shown. The process 1000 is, however, an example only and not limiting. The process 1000 can be altered, e.g., by having stages added, removed, rearranged, combined, and/or performed concurrently. Still other alterations to the process 1000 as shown and described are possible.

At stage 1002, one or more pedestrian motion states and one or more vehicular motion states are identified. The one or more pedestrian motion states include a walk state and the one or more vehicular motion states include an automobile stop state and at least one automobile move state. These states can be defined by, e.g., a processor 920 executing instructions stored on a memory 922, and/or by other means. Further, the motion states can be associated with, e.g., a motion state machine 16 stored on a memory 922, and/or by other means.

At stage 1004, acceleration data are obtained from one or more accelerometers 12.

At stage 1006, likelihoods are computed for the one or more pedestrian motion states and the one or more vehicular motion states for respective time intervals based on the acceleration data. Likelihood computation can be performed by various elements of a motion state classifier module 18, which can be implemented using, e.g., a processor 920 executing instructions stored on a memory 922, and/or other means. In particular, likelihood computation can be performed by a likelihood computation block as shown in FIGS. 2A, 2B, and/or 3, and/or by any other suitable mechanisms.

At stage 1008, the computed likelihoods are filtered to obtain present motion states for the respective time intervals. The filtering may be based on a probabilistic model (e.g., a HMM) configured to restrict transitions from the one or more pedestrian motion states to the vehicular motion states to transitions from the walk state to the automobile stop state and to restrict transitions from the vehicular motion states to the one or more pedestrian motion states to transitions from the automobile stop state to the walk state. The filtering performed at stage 1008 can be performed by various elements of a motion state classifier module 18, which can be implemented using, e.g., a processor 920 executing instructions stored on a memory 922, and/or other means. In particular, a filtering block as shown in FIG. 2A, a HMM algorithm block as shown in FIG. 2B, and/or any other suitable mechanisms, may be leveraged to perform the filtering. Those of skill in the art will appreciate that the present motion states for the respective time intervals are not limited to a present state at the time the likelihoods are calculated; rather, the present motion states may refer to the motion state that was present during the respective time interval or at least a portion of that interval. In some embodiments, a motion state for a respective time interval may be referred to as a respective motion. In certain embodiments, present motion state and respective motion state can be used interchangeably.

Some embodiments may be drawn to a mobile device with means for obtaining motion data from one or more motion-detecting devices. Example means for obtaining the motion data may be one or more accelerometers, motion detectors 12, additional device sensors 14, or orientation sensors 928. Embodiments may also include means for filtering the motion data to obtain present motion states for respective time intervals based on the motion data. Each of the present motion states for respective time intervals may correspond to one or more pedestrian motion states or one or more vehicular motion states. The one or more pedestrian motion states may comprise a walk state, and the one or more vehicular motion states may comprise a vehicular stop state. Example means for filtering may include filter probabilities module 208, feature extraction module 202 or 252, or within motion state classifier module 18 via processor 920 using memory 922 and software 924. In some embodiments, in the means for filtering, transitions from the one or more pedestrian motion states to the one or more vehicular motion states are restricted to transitions from the walk state to the vehicular stop state and transitions from at least one of the one or more vehicular motion states to at least one of the one or more pedestrian motion states are restricted to transitions from the vehicular stop state to the walk state.

In some embodiments, a mobile device may include means for computing likelihoods for the one or more pedestrian motion states and the one or more vehicular motion states for the respective time intervals. Example means for computing the likelihoods may include the processor 920 using memory 922 and software 924, MSDP classifier 804, motion state classifier module 18, module 204, module 254, or module 304.

In some embodiments, a mobile device may include means for obtaining sensor data from at least one of a Wi-Fi receiver, an audio input device or a GPS receiver, and means for computing the likelihoods for the one or more pedestrian motion states and the one or more vehicular motion states for respective time intervals based on the motion data and the sensor data. Example means for obtaining sensor data may include motion state classifier module 18, feature extraction module 202, module 252, module 302, or processor 920. Example means for computing the likelihoods based on the motion data and the sensor data may include the processor 920 using memory 922 and software 924, MSDP classifier 804, motion state classifier module 18, module 204, module 254, or module 304.

One or more of the components, steps, features and/or functions illustrated in FIGS. 1, 2A, 2B, 3, 4, 5, 6, 7, 8, 9 and/or 10 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2A, 2B, 3, 4, 5, 6, 7, 8 and/or 9 may be configured to perform one or more of the methods, features, or steps described in FIG. 10. The novel algorithms described herein may also be efficiently implemented in software (e.g., implemented by a processor executing processor-readable instructions tangibly embodied on a non-transitory computer storage medium) and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for detecting motion states of a mobile device in connection with vehicular travel comprising:
    obtaining motion data from one or more motion-detecting devices of the mobile device; and
    at the mobile device, filtering the motion data to determine motion states, the motion states comprising one or more pedestrian motion states and a plurality of vehicular motion states, the one or more pedestrian motion states comprising a walk state, and the plurality of vehicular motion states comprising a vehicular stop state and a vehicular move state;
    wherein the walk state indicates that the mobile device is in motion indicative of a user walking with the mobile device, the vehicular stop state indicates that the mobile device is in motion indicative of the mobile device being in a stationary vehicle, and the vehicular move state indicates that the mobile device is in a moving vehicle;
    wherein the motion states are obtained for respective time intervals during which the motion data is obtained from the one or more motion-detecting devices;
    wherein, during the filtering, transitions from the one or more pedestrian motion states to the plurality of vehicular motion states are restricted to transitions from the walk state to the vehicular stop state and transitions from the plurality of vehicular motion states to the one or more pedestrian motion states are restricted to transitions from the vehicular stop state to the walk state;
    determining, based on the filtering, that a present motion state of the mobile device is the vehicular move state; and
    controlling, by a processor of the mobile device, an operation of a device or software application in response to the determining that the present motion state is the vehicular move state, wherein the device or software application is an application executing on the mobile device or a remote device communicatively coupled to the mobile device through a network.

2. The method of claim 1 further comprising computing respective likelihoods that the mobile device was in the one or more pedestrian motion states or the plurality of vehicular motion states for the respective time intervals.

3. The method of claim 2 wherein computing the respective likelihoods comprises computing likelihoods that the mobile device was in the one or more pedestrian motion states or the plurality of vehicular motion states for the respective time intervals based on a state machine that comprises the one or more pedestrian motion states and the plurality of vehicular motion states.

4. The method of claim 3 wherein the state machine includes an extended state machine comprising one or more sub-states for states of the one or more pedestrian motion states and states of the plurality of vehicular motion states, and computing the respective likelihoods further comprises transitioning the mobile device state through at least one sub-state of a particular pedestrian motion state or vehicular motion state prior to transitioning to a different pedestrian motion state or vehicular motion state.

5. The method of claim 4 wherein a number of sub-states associated with the one or more pedestrian motion states and the plurality of vehicular motion states is based, at least in part, on an anticipated time spent in a state of the one or more pedestrian motion states and the plurality of vehicular motion states.

6. The method of claim 2 wherein the filtering comprises filtering the computed respective likelihoods using at least one of a forward-backward algorithm or a Viterbi algorithm.

7. The method of claim 2 wherein computing the respective likelihoods comprises:
    obtaining sensor data from at least one of a Wi-Fi receiver, an audio input device, and a GPS receiver; and
    computing the respective likelihoods based on the motion data and the sensor data.

8. The method of claim 1 wherein the motion data includes accelerometer data, and the one or more motion-detecting devices includes one or more accelerometers.

9. The method of claim 8 wherein the motion data only includes the accelerometer data.

10. The method of claim 8 wherein the filtering is based on a probabilistic model including the one or more pedestrian states and the plurality of vehicular motion states.

11. The method of claim 1 wherein the filtering comprises:
    identifying a first transition from the walk state to an interim state and a second transition from the interim state to one of the plurality of vehicular motion states; and
    classifying the interim state as the vehicular stop state.

12. The method of claim 1 wherein the filtering comprises:
    buffering the motion data for a buffer time interval; and
    obtaining the motion states for the respective time intervals based at least in part on the buffered motion data.

13. The method of claim 1 wherein the determining the present motion state is based on a most likely state transition determined from a sequence of most likely state transitions between the respective time intervals.

14. The method of claim 1 wherein the determining the present motion state is based on an estimated probability determined from respective state transitions between the respective time intervals.

15. The method of claim 14, wherein the determining the present motion state is based on further calculating a confidence score determined based on comparing two or more probabilities determined from a state transitions between two of the respective time intervals.

16. The method of claim 15 wherein:
    calculating the confidence score further comprises identifying a difference between the two or more probabilities; and the method further comprises:
comparing the difference to a confidence threshold; and
upon determining that the difference does not meet the confidence threshold, determining the present motion state as a default state or an unknown state.

17. A mobile device for detecting motion states of a mobile device in connection with vehicular travel comprising:
one or more motion detectors of the mobile device configured to generate motion data;
a state machine module comprising one or more pedestrian motion states and a plurality of vehicular motion states, the one or more pedestrian motion states comprising a walk state and the plurality of vehicular motion states comprising a vehicular stop state and a vehicular move state;
wherein the walk state indicates that the mobile device is in motion indicative of a user walking with the mobile device, the vehicular stop state indicates that the mobile device is in motion indicative of the mobile device being in a stationary vehicle, and the vehicular move state indicates that the mobile device is in a moving vehicle;
a filtering module communicatively coupled to the state machine module and configured to filter, at the mobile device, the motion data to determine motion states,
wherein the motion states are obtained for respective time intervals during which the motion data is obtained from the one or more motion detectors devices;
wherein, within the state machine module, transitions from the one or more pedestrian motion states to the plurality of vehicular motion states are restricted to transitions from the walk state to the vehicular stop state and transitions from the plurality of vehicular motion states to the one or more pedestrian motion states are restricted to transitions from the vehicular stop state to the walk state;
wherein the state machine module is further configured to determine, based on filtering by the filtering module, that a present motion state of the mobile device is the vehicular move state; and
a processor configured to execute instructions that implement the filtering module and the state machine module, wherein the instructions, when executed, cause the processor to control an operation of a device or software application in response to determining that the present motion state is the vehicular move state, wherein the device or software application is an application executing on the mobile device or a remote device communicatively coupled to the mobile device through a network.

18. The mobile device of claim 17 further comprising a likelihood computation module communicatively coupled to the one or more motion detectors, the state machine module and the filtering module and configured to compute respective likelihoods that the mobile device was in the one or more pedestrian motion states and the plurality of vehicular motion states for the respective time intervals.

19. The mobile device of claim 18 wherein the state machine includes an extended state machine comprising one or more sub-states for states of the one or more pedestrian motion states and states of the plurality of vehicular motion states, and the likelihood computation module is further configured to compute the respective likelihoods transitioning the mobile device state through all sub-states of a particular pedestrian motion state or vehicular motion state prior to transitioning to a different pedestrian motion state or vehicular motion state.

20. The mobile device of claim 19 wherein a number of sub-states to be associated with the one or more pedestrian motion states and the plurality of vehicular motion states is based, at least in part, on an anticipated time spent in a state of the one or more pedestrian motion states and the plurality of vehicular motion states.

21. The mobile device of claim 18 wherein the filtering module is further configured to filter the computed respective likelihoods using at least one of a forward-backward algorithm or a Viterbi algorithm.

22. The mobile device of claim 18 wherein the likelihood computation module is further configured to:
obtain sensor data from at least one of a Wi-Fi receiver, an audio input device, and a GPS receiver; and
compute the respective likelihoods based on the motion data and the sensor data.

23. The mobile device of claim 17 wherein the one or more motion detectors includes one or more accelerometers and the motion data includes accelerometer data.

24. A mobile device for detecting motion states of a mobile device in connection with vehicular travel comprising:
means for obtaining motion data from one or more means for detecting motion of the mobile device; and
means for filtering, at the mobile device, the motion data to determine motion states, the motion states comprising one or more pedestrian motion states and a plurality of vehicular motion states, the one or more pedestrian motion states comprising a walk state, and the plurality of vehicular motion states comprising a vehicular stop state and a vehicular move state;
wherein the walk state indicates that the mobile device is in motion indicative of a user walking with the mobile device, the vehicular stop state indicates that the mobile device is in motion indicative of the mobile device being in a stationary vehicle, and the vehicular move state indicates that the mobile device is in a moving vehicle;
wherein the motion states are obtained for respective time intervals during which the motion data is obtained from the one or more means for detecting motion;
wherein, within the means for filtering, transitions from the one or more pedestrian motion states to the plurality of vehicular motion states are restricted to transitions from the walk state to the vehicular stop state and transitions from the plurality of vehicular motion states to the one or more pedestrian motion states are restricted to transitions from the vehicular stop state to the walk state;
means for determining, based on filtering by the means for filtering, that a present motion state of the mobile device is the vehicular move state; and
means for controlling an operation of a device or software application in response to a determination that the present motion state is the vehicular move state, wherein the device or software application is an application executing on the mobile device or a remote device communicatively coupled to the mobile device through a network.

25. The mobile device of claim 24, further comprising means for computing respective likelihoods that the mobile device was in the one or more pedestrian motion states or the plurality of vehicular motion states for the respective time intervals.

26. The mobile device of claim 25 wherein the means for filtering comprises means for filtering the computed respective likelihoods using at least one of a forward-backward algorithm or a Viterbi algorithm.

27. The mobile device of claim 25 further comprising:
means for obtaining sensor data from at least one of a Wi-Fi receiver, an audio input device, and a GPS receiver; and
means for computing the respective likelihoods based on the motion data and the sensor data.

28. The mobile device of claim 24, wherein the motion data includes accelerometer data, and the one or more means for detecting motion comprise one or more accelerometers.

29. A non-transitory processor-readable medium for detecting motion states of a mobile device in connection with vehicular travel comprising processor-readable instructions configured to cause a processor to:
obtain motion data from one or more motion-detecting devices of the mobile device; and
at the mobile device, filter the motion data to determine motion states, the motion states comprising one or more pedestrian motion states and a plurality of vehicular motion states, the one or more pedestrian motion states comprising a walk state, and the plurality of vehicular motion states comprising a vehicular stop state and a vehicular move state;
wherein the walk state indicates that the mobile device is in motion indicative of a user walking with the mobile device, the vehicular stop state indicates that the mobile device is in motion indicative of the mobile device being in a stationary vehicle, and the vehicular move state indicates that the mobile device is in a moving vehicle;
wherein the motion states are obtained for respective time intervals during which the motion data is obtained from the one or more motion-detecting devices;
wherein, during the filtering, transitions from the one or more pedestrian motion states to the plurality of vehicular motion states are restricted to transitions from the walk state to the vehicular stop state and transitions from the plurality of vehicular motion states to the one or more pedestrian motion states are restricted to transitions from the vehicular stop state to the walk state;
determining, based on the filtering, that a present motion state of the mobile device is the vehicular move state; and
controlling an operation of a device or software application in response to the determining that the present motion state is the vehicular move state, wherein the device or software application is an application executing on the mobile device or a remote device communicatively coupled to the mobile device through a network.

30. The processor-readable medium of claim 29, wherein the instructions are further configured to cause the processor to compute respective likelihoods that the mobile device was in the one or more pedestrian motion states or the plurality of vehicular motion states for the respective time intervals.

* * * * *